(No Model.)

D. L. DAVIS.
ELECTRIC METER FOR ALTERNATING CURRENTS.

No. 402,410. Patented Apr. 30, 1889.

WITNESSES:

INVENTOR,
D. L. Davis,
Att'y.

UNITED STATES PATENT OFFICE.

DELAMORE L. DAVIS, OF SALEM, OHIO.

ELECTRIC METER FOR ALTERNATING CURRENTS.

SPECIFICATION forming part of Letters Patent No. 402,410, dated April 30, 1889.

Application filed January 15, 1889. Serial No. 296,409. (No model.)

*To all whom it may concern:*

Be it known that I, DELAMORE L. DAVIS, of Salem, in the county of Columbiana and State of Ohio, have invented a certain new and useful Improvement in Alternating-Current Electric Meters, of which improvement the following is a specification.

The object of my invention is to provide a simple and effective apparatus for the measurement and indication of alternating electric currents supplied to lamps or other translating devices, the unit of measurement being the strength of the current operating within a given time.

To this end my invention, generally stated, consists in the combination of an electro-magnet, an armature having a connected friction-plate, a rotatable disk subject to pressure from the friction-plate, and indicating mechanism actuated by the disk.

The improvement claimed is hereinafter fully set forth.

Figure 1:
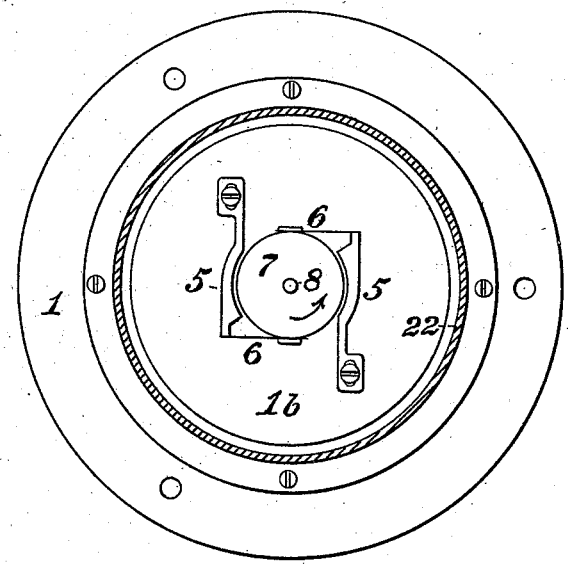
Figure 2:
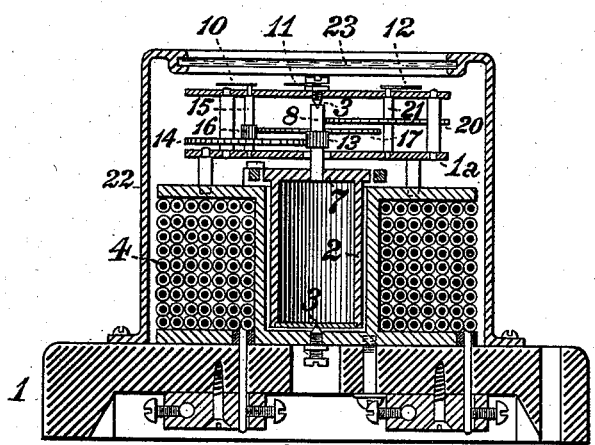

In the accompanying drawings, Figure 1 is a sectional plan view of an electric meter embodying my invention, and Fig. 2 a central section through the same.

In the practice of my invention I provide a base or support, 1, upon which is mounted an electro-magnet composed of a hollow soft-iron core, 2, which is journaled upon and adapted to rotate on end pivots or bearings, 3, which are fixed in the base 1 and in a plate, 1ª, secured thereto, and an inclosing coil or helix, 4, of insulated wire, the ends of which are suitably connected to the conducting-wires through which the alternating electric currents which it is desired to measure pass to the lamps or other translating devices to which they are supplied. A disk, 7, of soft metal, is formed upon or secured to one end of the core 2, and a shaft, 8, is fixed concentrically therein, the outer end of said shaft having its bearing in one of the fixed pivots 3, before specified. One or more armatures, 5— preferably two, as shown—are fixed upon a supporting-plate, 1ᵇ, secured to the base 1, each being in the form of a bar having a segmental recess concentric with the disk 7. The armatures 5 are fixed at one end to the plate 1ᵇ in such position relatively to the soft-iron disk 7 of the core 2 as to be attracted and drawn toward the disk 7 when the magnet is excited by the passage of an electric current through the coil, their movement, which is comparatively slight in degree, toward the disk and return to normal position at each cessation of current being permitted and effected, respectively, by the flexibility and elasticity of the metal of which they are formed. The armatures are thus adapted to be vibrated at and in the direction of their free ends, toward and from the axis of the core 2 and disk 7, by variations in the strength of the magnet induced by variations in the strength and changes of polarity of the currents passing through the helix 4. A flexible friction-plate, 6, is secured to the free end of each armature and projects therefrom in direction substantially tangential to the disk 7, the free ends of the friction-plates bearing with a comparatively slight degree of friction upon the periphery of the disk 7. The shaft of the disk 7 actuates an indicating mechanism of any suitable construction adapted to register the revolutions of the disk, that which is illustrated consisting of a series of indexes or hands, 10, 11, and 12, which are rotated by gearing at successively proportionately decreasing speeds over proper dial-plates fixed to the plate 1ª. The shaft 8 of the disk 7 carries a pinion, 13, engaging a gear, 14, on the shaft 15 of the index 10, the shaft 15 in turn carrying a pinion, 16, engaging a gear, 17, on the shaft (which is not shown) of the index 11, and the shaft of the index 11 carrying a pinion engaging a gear, 20, on the shaft 21 of the index 12. The mechanism is inclosed in and protected by a tight case, 22, having a glass cap, 23, to admit of observation.

In operation the vibrations of the armatures 5, induced by the alternations of current, are transmitted through the friction-plates 6 to the disk 7, the movements of the friction-plates being substantially tangential to the disk, and thus tending to rotate the latter. The peripheral friction at the points of contact of the plates 6 and disk 7 being greater when the attraction of the magnet draws the armatures out of normal position than during the returning movements of the armatures by reason of the attraction of the friction-plates by the core and disk, such difference of friction rotates the disk by intermittent impulses in the direction of the vibrations of the armatures when attracted, or, as shown by the arrow in Fig. 1, the variations of the strength of current in given times being measured by the revolutions of the shaft of the disk, which are registered by the indicating mechanism.

I do not limit myself to the specific construction shown and described, as the structural features of the same may be varied without departure from my invention, the essential feature of which consists in the rotation of a disk connected with and actuating indicating mechanism by the difference in friction upon the disk induced by the intermissions of magnetic attraction resultant upon alternations of current acting upon a magnet.

I claim as my invention and desire to secure by Letters Patent—

1. In an electric meter for alternating currents, the combination of an electro-magnet, an armature vibrating with the current-alternations and having a connected friction-plate, a disk subject to pressure from the friction-plate and rotated by its vibrations, and an indicating mechanism actuated by the disk, substantially as set forth.

2. In an electric meter for alternating currents, the combination of an electro-magnet, an armature which is movable in opposite directions under the attraction of the magnet and under its own elasticity, respectively, a friction-plate secured to the armature, a rotatable disk subject to pressure from the friction-plate, and an indicating mechanism actuated by the disk, substantially as set forth.

3. In an electric meter for alternating currents, the combination of a coil or helix, a core journaled on pivots and adapted to rotate within the helix, a disk fixed to said core concentric with its pivots, an armature-bar fixed at one end and extending therefrom adjacent to the disk and substantially tangential thereto, a friction-plate fixed to the free end of the armature-bar and bearing against the periphery of the disk, and an indicating mechanism actuated by the disk, substantially as set forth.

DELAMORE L. DAVIS.

Witnesses:
B. S. AMBLER,
W. B. SMITH.